(12) United States Patent
Thompson

(10) Patent No.: US 12,498,210 B2
(45) Date of Patent: Dec. 16, 2025

(54) CALIBRATION SYSTEM FOR MAGNETIC FORCE DILATOMETER

(71) Applicant: GM GLOBAL TECHNOLOGY OPERATIONS LLC, Detroit, MI (US)

(72) Inventor: Nathan Thompson, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 194 days.

(21) Appl. No.: 18/545,060

(22) Filed: Dec. 19, 2023

(65) Prior Publication Data

US 2025/0198739 A1 Jun. 19, 2025

(51) Int. Cl.
*G01B 7/24* (2006.01)
*H01M 10/42* (2006.01)

(52) U.S. Cl.
CPC .......... *G01B 7/24* (2013.01); *H01M 10/4285* (2013.01)

(58) Field of Classification Search
CPC .............................. G01B 7/24; H01M 10/4285
USPC ...................... 324/500, 600, 76.11, 200, 209
See application file for complete search history.

(56) References Cited

U.S. PATENT DOCUMENTS

| | | | |
|---|---|---|---|
| 10,312,555 B2 | 6/2019 | Fukuda et al. | |
| 10,656,233 B2* | 5/2020 | Morrison | G01R 35/005 |
| 2014/0370361 A1 | 12/2014 | Cheong et al. | |
| 2016/0064780 A1 | 3/2016 | Jarvis et al. | |
| 2017/0077561 A1 | 3/2017 | Fukuda et al. | |
| 2017/0092997 A1 | 3/2017 | Fukuda et al. | |
| 2018/0156605 A1* | 6/2018 | Swallow | G01N 29/00 |
| 2020/0333376 A1* | 10/2020 | Graf | G01R 35/005 |

FOREIGN PATENT DOCUMENTS

| | | |
|---|---|---|
| DE | 102017215144 A1 | 2/2019 |
| DE | 112018007256 T5 | 11/2020 |
| DE | 102021202154 A1 | 9/2022 |
| DE | 102021212386 A1 | 5/2023 |
| DE | 102022106393 A1 | 9/2023 |
| DE | 102023120823 A1 | 6/2024 |

(Continued)

OTHER PUBLICATIONS

German Office Action from counterpart DE1020241038926, dated Aug. 27, 2024.

(Continued)

*Primary Examiner* — Giovanni Astacio-Oquendo
*Assistant Examiner* — Trung Q Nguyen

(57) ABSTRACT

A dilatometer configured to measure dilation of an electrode in a battery. The dilatometer including a controller configured to: receive calibration force readings from a magnetic force sensor, the calibration force readings including magnetic force strength between a magnet of the dilatometer and a magnetic spacer of the battery at different calibration distances resulting from movement of the magnet relative to the magnetic spacer across a distance range during calibration; assign a position value to each one of the calibration force readings, the position value is a distance between the magnet and the magnetic spacer of the battery; and predict magnetic force strength between the magnet and the magnetic spacer across an entirety of the distance range based on the position values of the calibration force readings.

20 Claims, 16 Drawing Sheets

(56) References Cited

FOREIGN PATENT DOCUMENTS

| | | |
|---|---|---|
| EP | 3933956 A1 | 1/2022 |
| KR | 20080109121 A | 12/2008 |

OTHER PUBLICATIONS

German Office Action from counterpart DE1020241008180, dated Aug. 27, 2024.
U.S. Appl. No. 18/087,452, Balogh et al.

* cited by examiner

CALIBRATION SYSTEM FOR MAGNETIC FORCE DILATOMETER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for measuring battery dilation, and more particularly to a calibration system for a magnetic force dilatometer.

A battery pack includes one or more battery modules each including a plurality of battery cells. The battery cells experience dilation as the battery is charged and discharged. As the battery cells charge and discharge, chemical reactions inside the battery cells cause anode or cathode electrodes to expand or dilate and to contract. Monitoring dilation of the battery cells is useful for avoiding electrode dry out, improving battery cell life, engineering battery cells, estimating energy density, and/or designing battery modules and battery packs.

SUMMARY

The present disclosure includes, in various features, a dilatometer configured to measure dilation of an electrode in a battery. The dilatometer includes: a first support configured to support the battery; a magnet mounted adjacent to the first support; a magnetic force sensor configured to measure a magnetic force strength between the magnet and a magnetic spacer within the battery supported by the first support; a second support configured to move the magnet relative to the magnetic spacer of the battery supported by the first support; and a controller. The controller is configured to: receive calibration force readings from the magnetic force sensor, the calibration force readings including the magnetic force strength between the magnet and the magnetic spacer at different calibration distances resulting from movement of the magnet relative to the magnetic spacer across a distance range during calibration; assign a position value to each one of the calibration force readings, the position value is a distance between the magnet and the magnetic spacer of the battery; and predict the magnetic force strength between the magnet and the magnetic spacer across an entirety of the distance range based on the position values of the calibration force readings.

In further features, the battery is a coin cell battery.

In further features, the different calibration distances are intervals of 10 µm.

In further features, the different calibration distances are intervals of 50 µm.

In further features, the calibration force readings include multiple readings at each one of the different calibration distances.

In further features, the distance range is 250 µm.

In further features, the magnetic force sensor is a load sensor.

In further features, a translation stage is configured to move the second support and the magnet relative to both the first support and the magnetic spacer of the battery supported by the first support.

In further features, the controller is further configured to: normalize the calibration force readings into normalized calibration data, and construct an idealized calibration pattern based on the calibration force readings; and perform dynamic time warping (DTW) based on the calibration force readings, the normalized calibration data, and the idealized calibration pattern.

In further features, the controller is configured to further process the calibration force readings by truncating the calibration force readings based on the DTW and removing noise from the calibration force readings.

In further features, assigning the position value to each one of the calibration force readings includes arranging the calibration force readings into groups and labeling the groups with the position values.

In further features, the controller is configured to predict the magnetic force strength between the magnet and the magnetic spacer across the entirety of the distance range by performing linear regression across the groups.

The present disclosure further includes, in various features, a dilatometer configured to measure dilation of an electrode in a battery. The dilatometer includes: a first support configured to support the battery; a magnet mounted adjacent to the first support; a magnetic force sensor configured to measure a magnetic force strength between the magnet and a magnetic spacer within the battery supported by the first support; a second support configured to move the magnet relative to the magnetic spacer of the battery supported by the first support; and a controller. The controller is configured to: receive calibration force readings from the magnetic force sensor, the calibration force readings including the magnetic force strength between the magnet and the magnetic spacer at different calibration distances resulting from movement of the magnet relative to the magnetic spacer across a distance range during calibration; normalize the calibration force readings into normalized calibration data; construct an idealized calibration pattern based on the calibration force readings; perform dynamic time warping based on the calibration force readings, the normalized calibration data, and the idealized calibration pattern to identify irrelevant portions of the calibration force readings; assign a position value to each one of the calibration force readings, the position value is a distance between the magnet and the magnetic spacer of the battery; predict the magnetic force strength between the magnet and the magnetic spacer across an entirety of the distance range, based on the position values of the calibration force readings; receive a battery test force reading from the magnetic force sensor, the battery test force reading including the magnetic force strength between the magnet and the magnetic spacer of the battery during a dilation test of the battery; and identify a dilation distance within the distance range corresponding to the battery test force reading, the dilation distance corresponding to dilation of the electrode in the battery.

In further features, assigning the position value to each one of the calibration force readings includes arranging the calibration force readings into groups and labeling the groups with the position values.

In further features, the controller is configured to predict the magnetic force strength between the magnet and the magnetic spacer across the entirety of the distance range by performing linear regression across the groups.

The present disclosure also includes, in various features, a method for measuring dilation of an electrode in a battery with a dilatometer. The method includes: receiving calibration force readings at a controller of the dilatometer from a magnetic force sensor of the dilatometer, the calibration force readings including a magnetic force strength between a magnet of the magnetic force sensor and a magnetic spacer of the battery at different calibration distances resulting from movement of the magnet relative to the magnetic spacer across a distance range during calibration; assigning with the controller a position value to each one of the calibration force readings, the position value is a distance between the magnet and the magnetic spacer of the battery; predicting with the controller the magnetic force strength between the magnet and the magnetic spacer across an entirety of the distance range based on the position values of the calibration force readings; receiving at the controller a battery test force reading from the magnetic force sensor, the battery test force reading including a magnetic force strength between the magnet and the magnetic spacer of the battery during a dilation test of the battery; and identifying with the controller a dilation distance within the distance range corresponding to the battery test force reading, the dilation distance corresponding to dilation of the electrode in the battery.

The method further includes: normalizing with the controller the calibration force readings into normalized calibration data, and constructing with the controller an idealized calibration pattern based on the calibration force readings; and performing dynamic time warping with the controller based on the calibration force readings, the normalized calibration data, and the idealized calibration pattern.

The method further includes assigning the position value to each one of the calibration force readings with the controller including arranging the calibration force readings into groups and labeling the groups with the position values with the controller.

The method further includes predicting the magnetic force strength between the magnet and the magnetic spacer across the entirety of the distance range by performing linear regression across the groups with the controller.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Battery cells such as lithium-ion batteries (LIBs) experience reversible and irreversible expansion or dilation during cycling. Accurately understanding battery cell expansion or dilation can be used to avoid electrode dry out, improve battery cell life, engineer battery cells, estimate energy density, and/or design a battery pack. For next generation anode materials such as silicon, battery cell expansion or dilation is a much larger concern because some electrode materials experience ~300% volume change during cycling.

The present disclosure relates to a magnetic force dilatometer (MFD) configured to measure battery cell dilation during cycling. In commonly assigned U.S. patent application Ser. No. 18/087,452, filed on Dec. 22, 2022, and entitled, "SYSTEMS AND METHODS FOR MEASURING BATTERY DILATION," which is hereby incorporated by reference in its entirety, an MFD is configured to measure dilation of battery cells during cycling. The following commonly assigned U.S. Patent Applications are also hereby incorporated by reference in their entirety: U.S. patent application Ser. No. 18/305,075 filed on Apr. 21, 2023 and titled "MAGNETIC FORCE DILATOMETER WITH TEMPERATURE COMPENSATION;" and U.S. patent application Ser. No. 18/526,610 filed on Dec. 1, 2023 titled "MAGNETIC FORCE DILATOMETER FOR MEASURING DILATION OF INDIVIDUAL ELECTRODE."

In accordance with the present disclosure, a calibration process for an MFD involves taking various calibration force readings of a magnetic force sensor at different calibration distances between a magnet of the MFD and a magnetic spacer of the battery being tested. To accomplish this, the magnet of the MFD is often manually moved to different positions, and multiple readings of the magnetic force sensor are recorded at each distance. The calibration force readings are used to generate a graph of magnetic force strength measured by the magnetic force sensor versus distance between the dilatometer magnet and the magnetic spacer of the battery. Changes in magnetic force strength correspond to changes in the distance, which correspond to a degree of dilation of an electrode in the battery being tested. As described herein, the controller of the present disclosure is configured to automate various aspects of the calibration and testing.

Figure 1A:
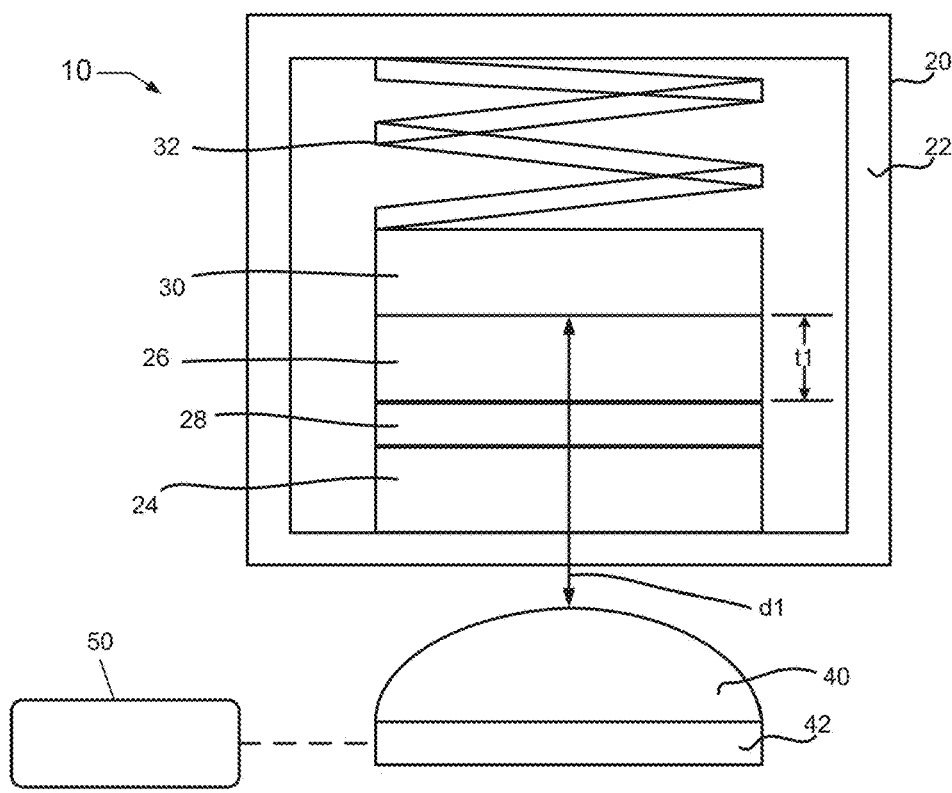
FIGS. 1A and 1B are side views of an example of a magnetic force dilatometer (MFD) for measuring dilation of a battery cell in accordance with the present disclosure.
Figure 1B:
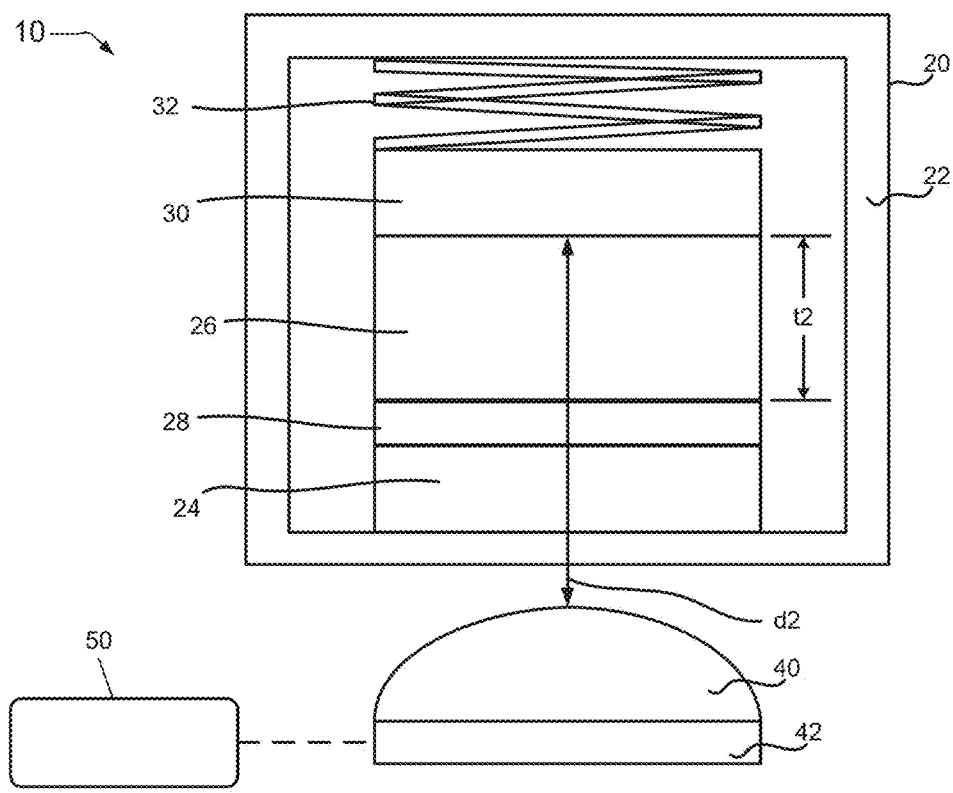

Referring now to FIGS. 1A and 1B, an MFD 10 for measuring battery dilation is shown. The MFD 10 includes a battery cell 20 (e.g., a lithium ion battery cell). The battery cell 20 includes a housing 22 enclosing one or more sets of first electrodes 24, second electrodes 26, and separators 28. A magnetic spacer 30 is arranged adjacent to the second electrode 26. The magnetic spacer 30 (e.g., a permanent magnet, an electromagnet, or a ferromagnetic material) is arranged to move within the housing 22 as the first electrode 24 or the second electrode 26 expands during dilation of the battery cell 20.

A biasing member 32 (e.g., a spring) is arranged between the magnetic spacer 30 and an inner surface of the housing 22. The biasing member 32 holds the magnetic spacer 30 against the second electrode 26, and is flexible to accommodate movement of the magnetic spacer 30 as the first electrode 24 and/or the second electrode 26 expand during dilation.

The MFD 10 further includes an external magnet 40, which is arranged outside of the housing 22 of the battery cell 20 and spaced from the housing 22. The external magnet 40 may be a hemispherical magnet, a spherical magnet, a conical magnet, a cylindrical magnet, a square magnet, a rectangular magnet, or any other suitable magnet. The external magnet 40 and the magnetic spacer 30 are arranged within each other's magnetic fields.

The MFD 10 also includes a sensor 42 configured to measure magnetic force strength between the external magnet 40 and the magnetic spacer 30. The sensor 42 may be any suitable force sensor, such as a load cell sensor, a strain gauge sensor, a pressure sensor, etc. In some applications, the external magnet 40 and the sensor 42 may be replaced with a Hall sensor, a magnetoresistor, a fluxgate sensor, a superconducting quantum interference device (SQUID) sensor, a resonant sensor, an induction magnetometer, a reed contact sensor, a Wiegand wire sensor, or a magnetic force sensor.

A controller 50 communicates with the sensor 42. The controller 50 is configured to determine dilation of the battery cell 20 based on changes in the magnetic force strength between the external magnet 40 and the magnetic spacer 30. For example, the change in dilation occurs in response to expansion of either the first electrode 24 and/or the second electrode 26. Expansion or dilation causes movement of the magnetic spacer 30 relative to the external magnet 40.

In FIG. 1A, the battery cell 20 is shown in a non-dilated state with the external magnet 40 spaced from the magnetic spacer 30 at a distance d1. The second electrode 26 has a thickness t1. In FIG. 1B, the battery cell 20 is shown in a dilated state. The thickness of the second electrode 26 increased from t1 to t2. As the second electrode 26 (and/or the first electrode 24) increases in thickness, the magnetic spacer 30 moves further away from the external magnet 40. For example, in the non-dilated state of FIG. 1A, the magnetic spacer 30 is arranged at a distance d1 from the external magnet 40. In the dilated state of FIG. 1B, the second electrode 26 is arranged at a distance d2 from the external magnet 40, which is greater than the distance d1. At distance d2, the magnetic attraction between the external magnet 40 and the magnetic spacer 30 is less than at distance d1.

In some examples, the controller 50 uses one or more formulas relating dilation to the load cell measurement and/or temperature. In other examples, the controller 50 includes memory storing a first calibration table storing dilation as a function of the load cell measurement and a second calibration table storing dilation compensation values as a function of temperature. The first calibration table includes the known magnetic force strength between the external magnet 40 and the magnetic spacer 30 at different distances d (see graph 750 of FIG. 18, for example). The second calibration table stores dilation compensation values at different temperatures. In some examples, the first and second calibration tables are combined into a single table indexed by the load cell measurement and the measured temperature and/or strain, which is a function of temperature. Using the first and/or second calibration tables, the controller 50 determines the distance d2 between external magnet 40 and the second electrode 26 corresponding to the magnetic strength measured by the sensor 42 as compensated based on the measured temperature. The distance d2 represents the dilation of the second electrode 26 (and/or the first electrode 24).

The dilation data can be used for a variety of different purposes. For example, knowing the degree to which the battery cell 20 has dilated after a particular number of charge/discharge cycles and/or under various conditions can be useful for designing batteries that are less susceptible to electrode dry out and have increased cell life. The information may also be used during engineering of the battery cells, estimating energy density, and designing various battery modules and packs. An exemplary calibration procedure is explained in further detail herein.

Figure 2:
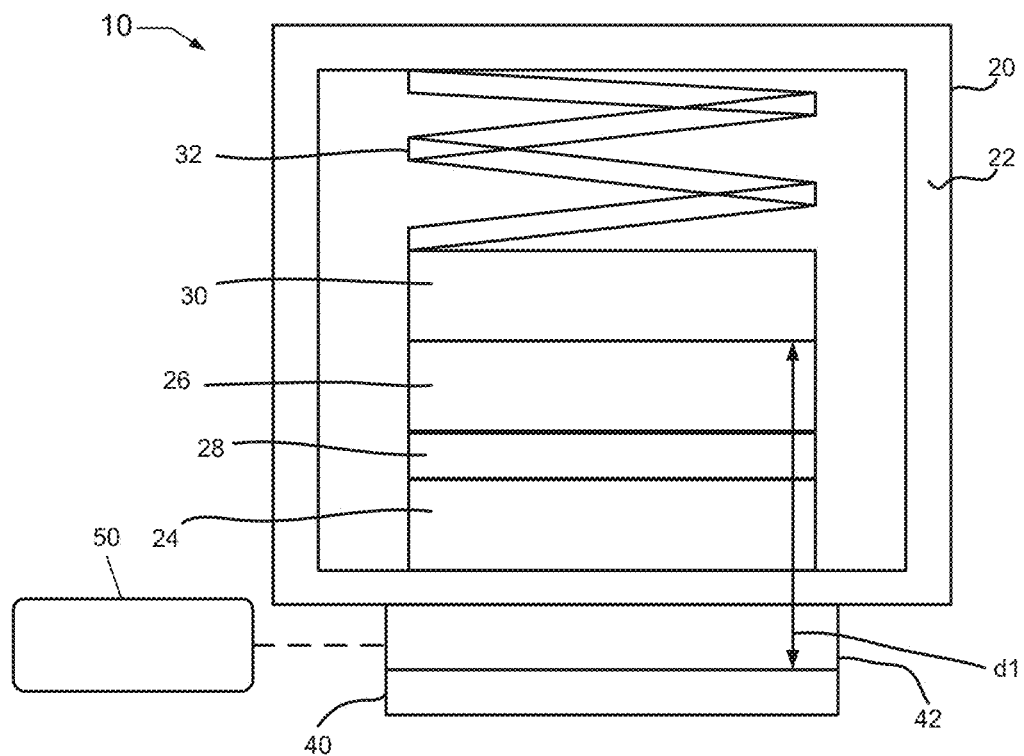
FIGS. 2 to 4 are side views of other examples of MFDs for measuring dilation of a battery cell in accordance with the present disclosure.

Referring now to FIG. 2, the sensor 42 is arranged between the external magnet 40 and the housing 22. The sensor 42 is in direct contact with the housing 22 and includes a pressure sensor.

Figure 3:
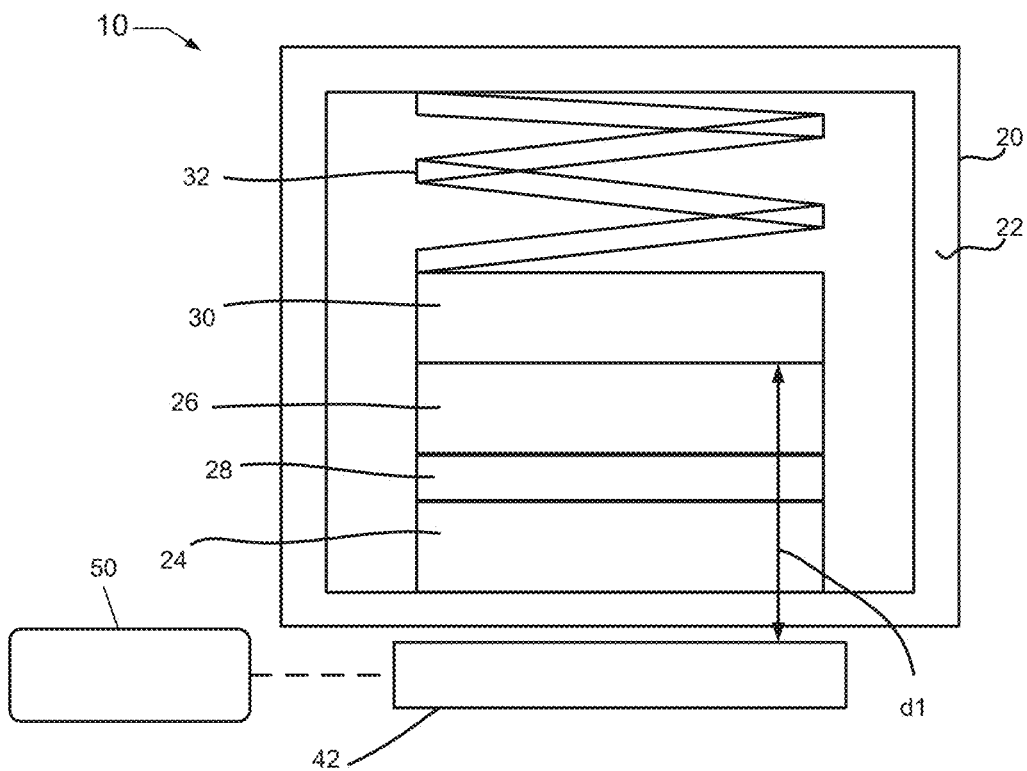
Figure 4:
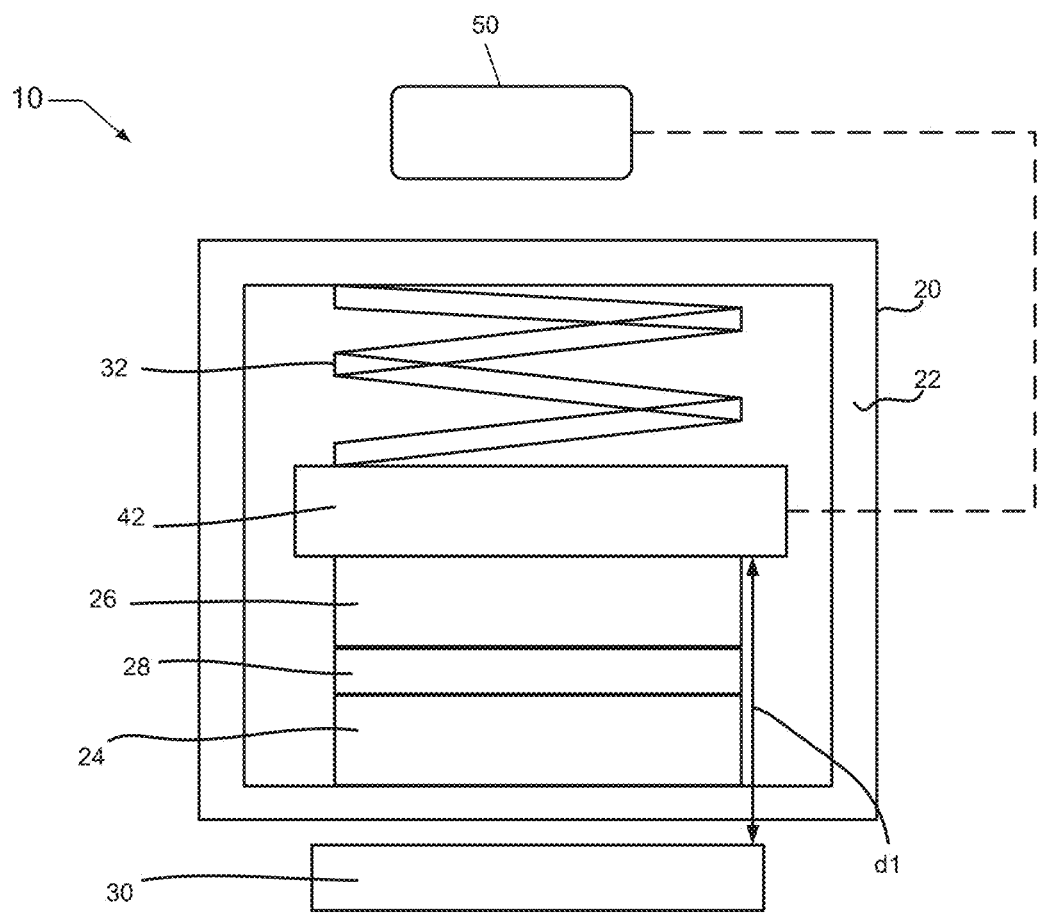
Figure 5:
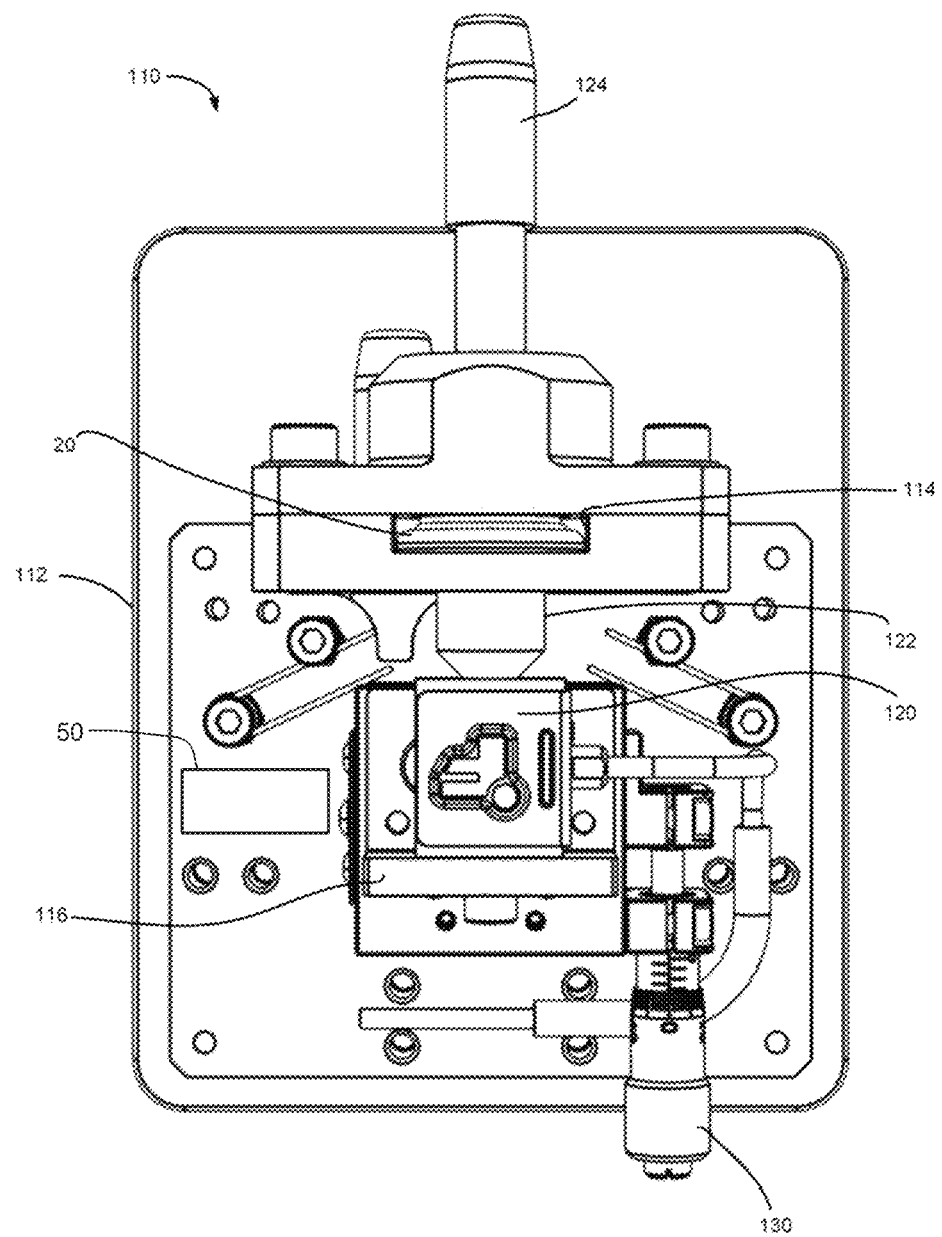
FIG. 5 is a plan view of another example of an MFD for measuring dilation of a battery cell in accordance with the present disclosure.
Figure 6:
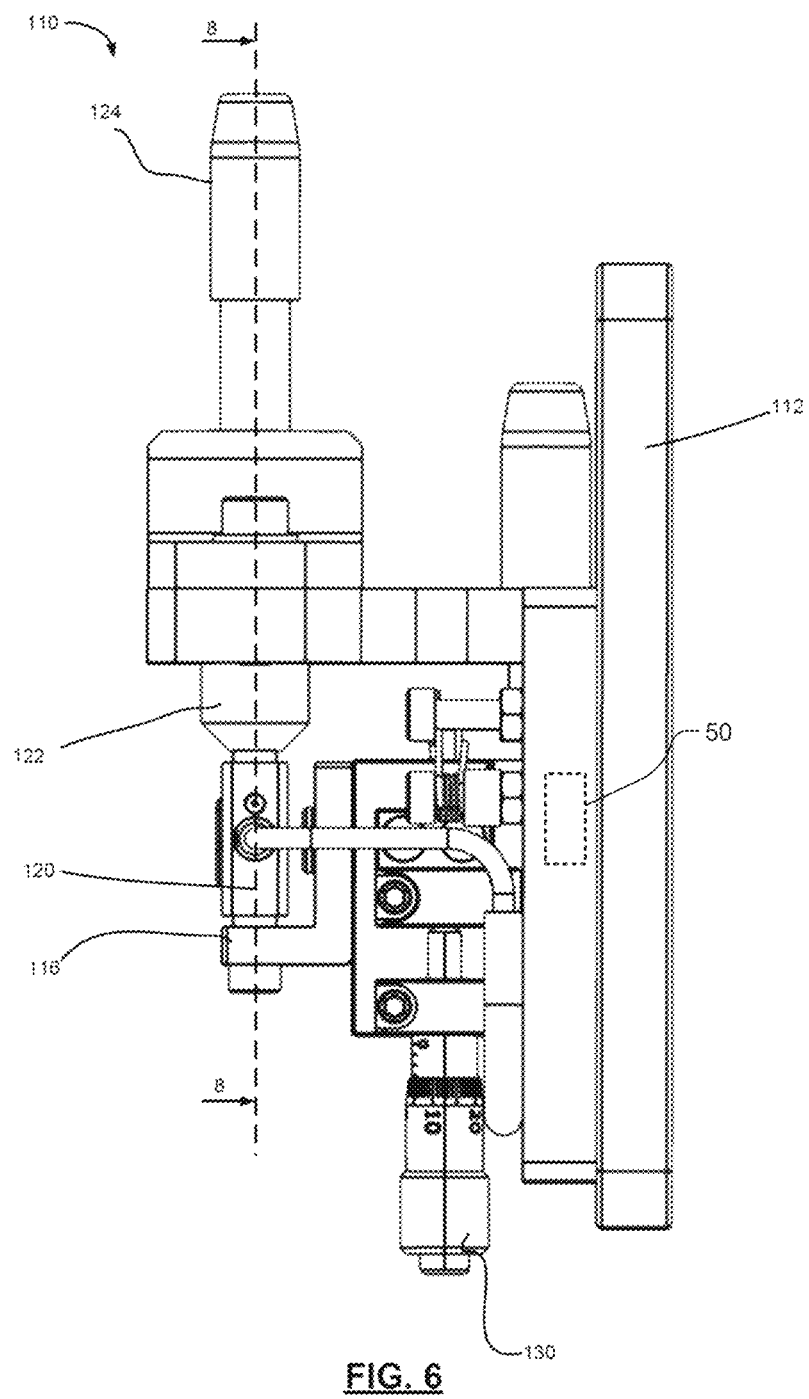
FIG. 6 is a side view of the MFD of FIG. 5.
Figure 7:
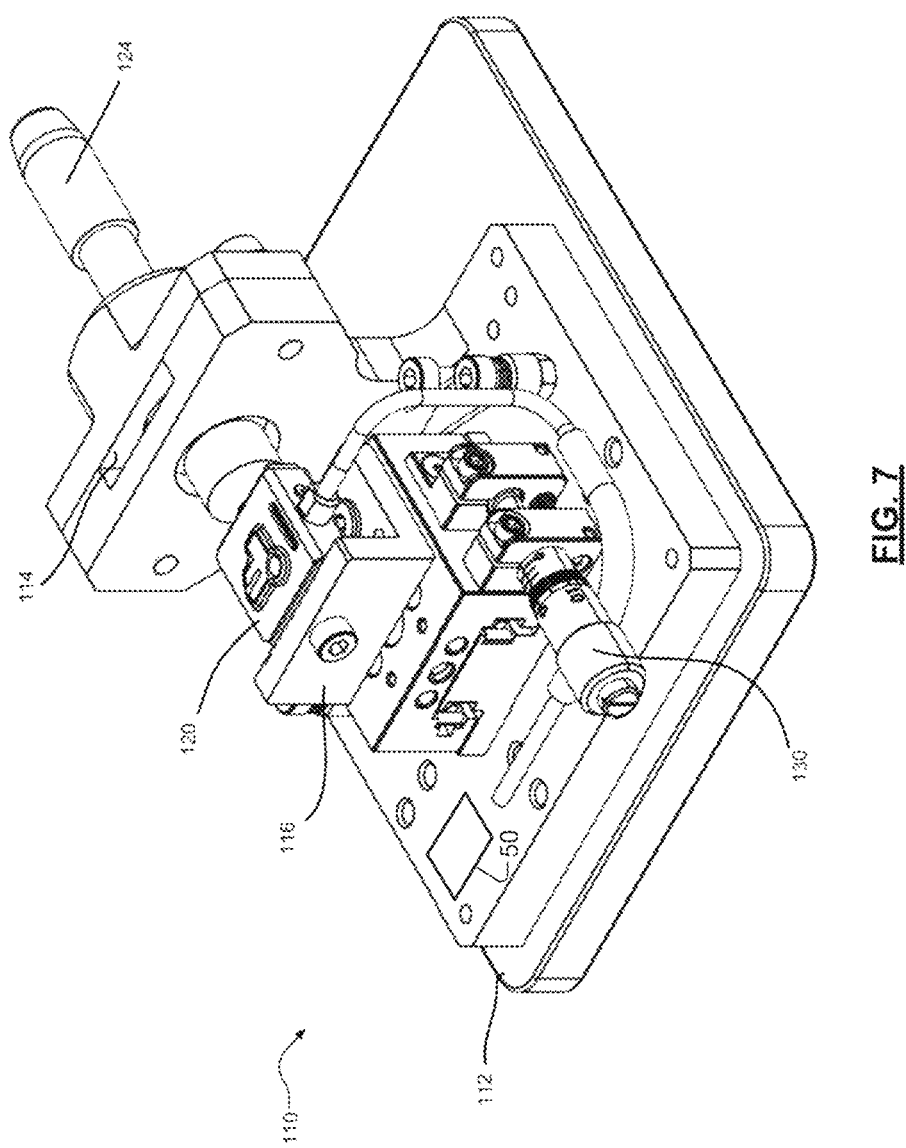
FIG. 7 is a perspective view of the MFD of FIG. 5.

Referring now to FIGS. 3 and 4, the sensor 42 comprises a magnetic sensor. In some examples, the sensor 42 is selected from a group consisting of a Hall sensor, a magnetoresistor sensor, a fluxgate sensor, a sensor including a superconducting quantum interference device (SQUID), a resonant sensor, an induction magnetometer, a reed contact sensor, a Wiegand wire sensor, and/or a magnetic force sensor. The sensor 42 is spaced from the housing 22.

In FIG. 4, the positions of the sensor 42 and the magnetic spacer 30 are reversed. The sensor 42 is arranged within the housing 22 between the second electrode 26 and the biasing member 32, and the magnetic spacer 30 is arranged outside of the housing 22 spaced from or in contact with the housing 22.

FIGS. 5-8 illustrate another dilatometer 110 in accordance with the present disclosure configured to measure dilation with temperature compensation of any suitable battery cell as the battery cell is charged and discharged. For example, the dilatometer 110 is configured to measure real time dilation of the battery cell 20 of FIGS. 1A, 1B, 2, 3, and 4. The dilatometer 110 includes a stand 112 (e.g., base plate) and a battery cell holder 114 mounted to the stand 112.

The battery cell holder 114 is configured to hold a coin cell battery cell or any other suitable type of battery cell. Leads are connected to the battery cell 20 for charging and discharging the battery cell 20. A translation stage 116 is mounted to the battery cell holder 114 to support a load cell 120. The load cell 120 may be any suitable load cell, such as a Miniature S-Bear Jr. Load Cell 2.0 (Model LSB201) from Futek Advanced Sensor Technology, Inc. of Irvine, CA. The dilatometer 110 includes a micrometer 130 for adjusting the vertical height of the translation stage 116 and to adjust the vertical position of the load cell 120 arranged on the translation stage 116.

Figure 8:
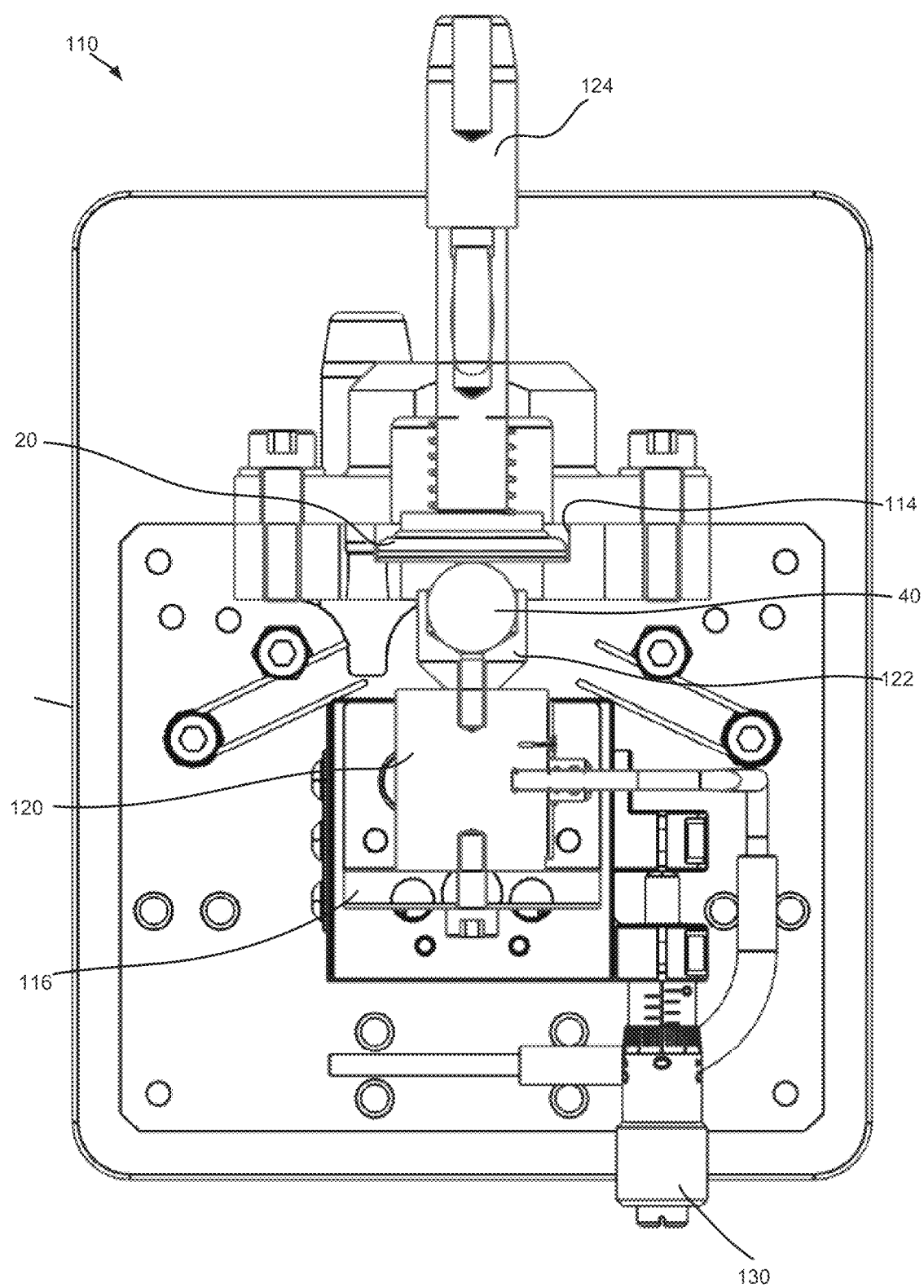
FIG. 8 is a cross-sectional view of the MFD of FIG. 5.

A magnet holder 122 is arranged on the load cell 120 and is configured to hold the external magnet 40. In this example, the external magnet 40 includes a spherical magnet (FIG. 8, for example). As can be appreciated, the magnet holder 122 can be configured to hold external magnets having any other suitable shape. The battery cell 20 is supported in the battery cell holder 114 between the external magnet 40 and a compression member 124, which holds the battery cell 20 in place.

Figure 9:
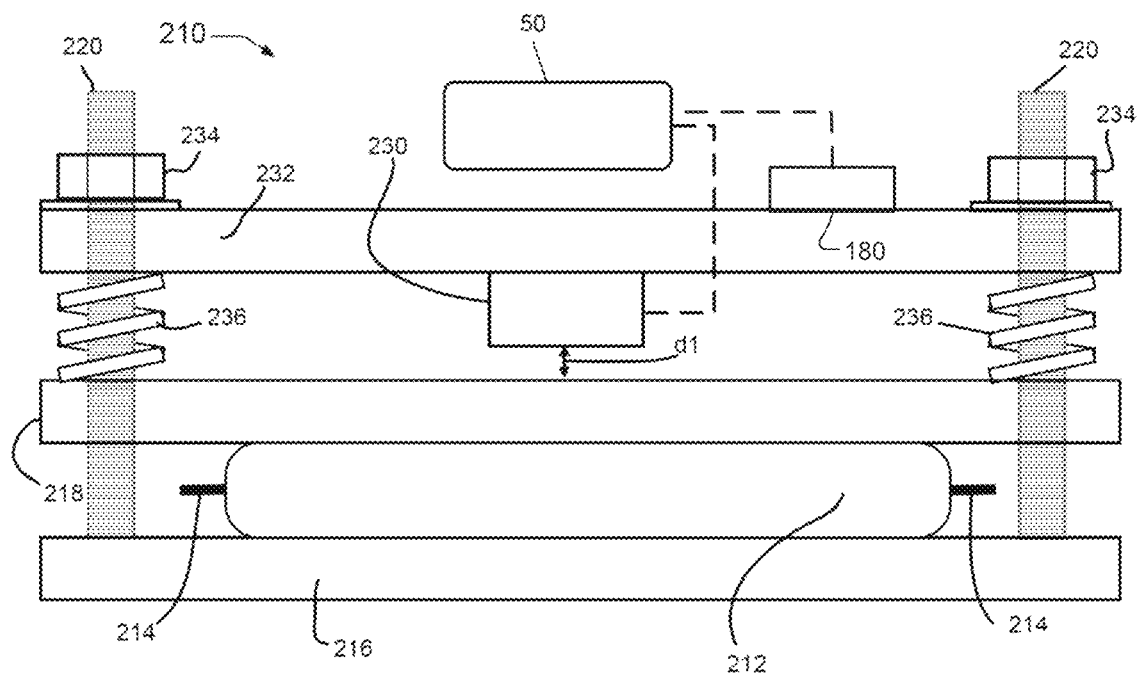
FIG. 9 is a side view of a MFD for measuring dilation of a pouch cell battery in accordance with the present disclosure.

Referring now to FIG. 9, a system 210 for measuring battery dilation of a pouch cell battery 212 is shown. The pouch cell battery 212 includes battery terminals 214 and is seated on a fixed plate 216. The pouch cell battery 212 is between the fixed plate 216 and a magnet in the form of a compression plate 218 that floats. The compression plate 218 may be made of any suitable magnetic material (e.g., steel), or have a magnet or magnetic material embedded in or attached to a surface of the compression plate 218. The compression plate 218 is arranged on supports 220. Opposite to the compression plate 218 is a sensor 230 configured to sense magnetic force, such as a magnetic field sensor or a load cell (e.g., the load cell 120). The sensor 230 is mounted to a fixed plate 232, and thus the sensor 230 is stationary. The sensor 230 is in communication with the controller 50. The fixed plate 232 is mounted to the supports 220 and fixed in position by fasteners 234. Between the fixed plate 232 and the compression plate 218 are springs 236 for accommodating movement of the compression plate 218 during dilation. A sensor 180 such as a temperature or strain sensor measures temperature or strain (and derives temperature based on strain).

As the pouch cell battery 212 expands during dilation, the distance d1 between the sensor 230 and the compression plate 218 decreases, and the strength of the magnetic field between the compression plate 218 and the sensor 230 changes. The controller 50 is configured to measure the degree of dilation of the pouch cell battery 212 based on the change in the magnetic force strength between the compression plate 218 and the sensor 230. The system 210 may be calibrated in accordance with the present disclosure, but modified to account for the distance d1 decreasing during dilation instead of increasing. The system 210 may be calibrated in any other suitable manner that correlates a measured magnetic field strength between the compression plate 218 and the sensor 230 with a degree to which the pouch cell 212 has dilated.

Figure 10:
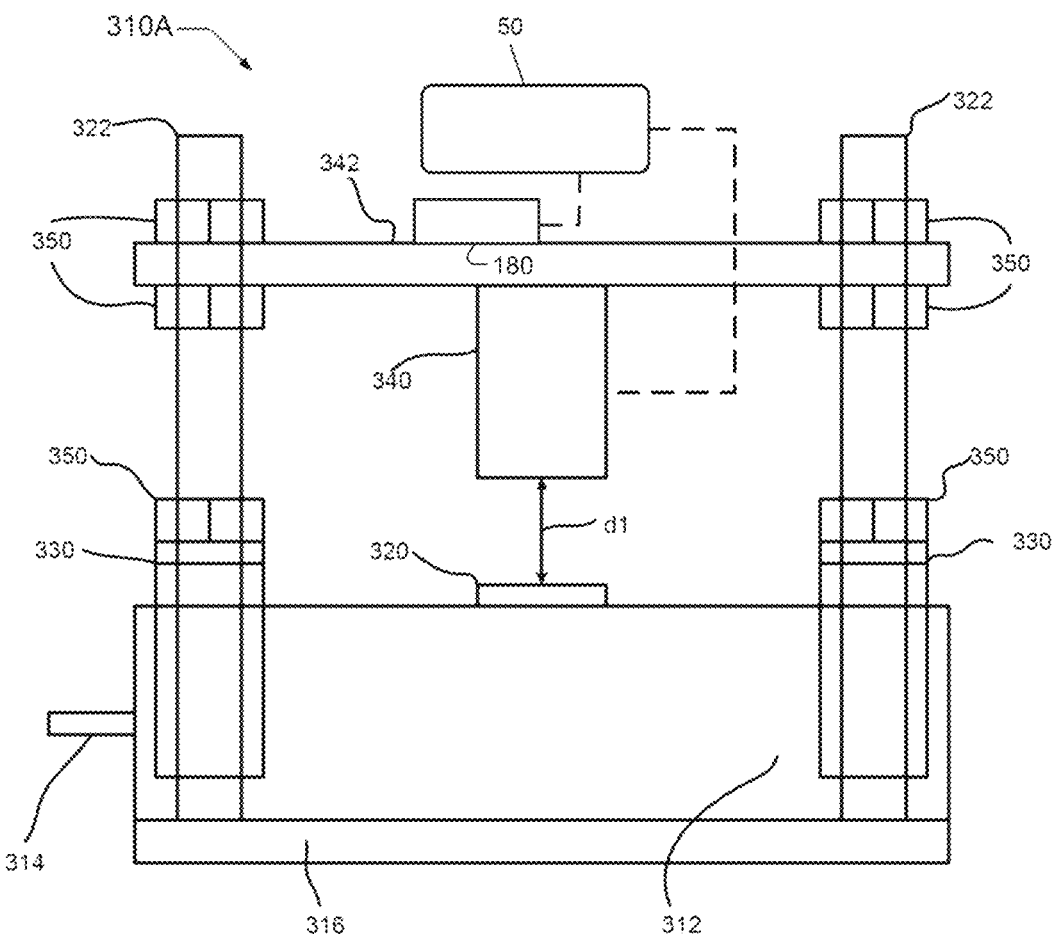
FIGS. 10 and 11 are side views of MFDs for measuring dilation of a prismatic cell battery according to the present disclosure.

With reference to FIG. 10, a system 310A for measuring battery dilation of a prismatic cell battery 312 is shown. The prismatic cell battery 312 includes a battery terminal 314 and is mounted to a fixed plate 316. A magnet 320 is mounted to the prismatic cell battery 312. Supports 322 extend from the plate 316 including brackets 330. The brackets 330 hold the prismatic cell battery 312 against the plate 316. During dilation, the prismatic cell battery 312 expands such that the magnet 320 moves towards a sensor 340 mounted to a fixed plate 342. The fixed plate 342 is rigidly secured to the supports 322 with fasteners 350. The sensor 340 is in communication with the controller 50.

The sensor 340 is configured to sense magnetic force. The sensor 340 may include a magnetic field sensor or a load cell (e.g., the load cell 120), for example. As the prismatic cell battery 312 expands during dilation, the distance d1 between the magnet 320 and the sensor 340 decreases, and the strength of the magnetic field between magnet 320 and the sensor 340 changes. The controller 50 is configured to measure the degree of dilation of the prismatic cell battery 312 based on the change in the magnetic force strength between the magnet 320 and the sensor 340.

The system 310A is calibrated in accordance with the present disclosure and modified to account for the distance d1 decreasing during dilation instead of increasing. The system 310A may alternatively be calibrated in any other suitable manner that correlates a measured magnetic field strength between the magnet 320 and the sensor 340 with a degree to which the prismatic cell battery 312 has dilated.

Figure 11:
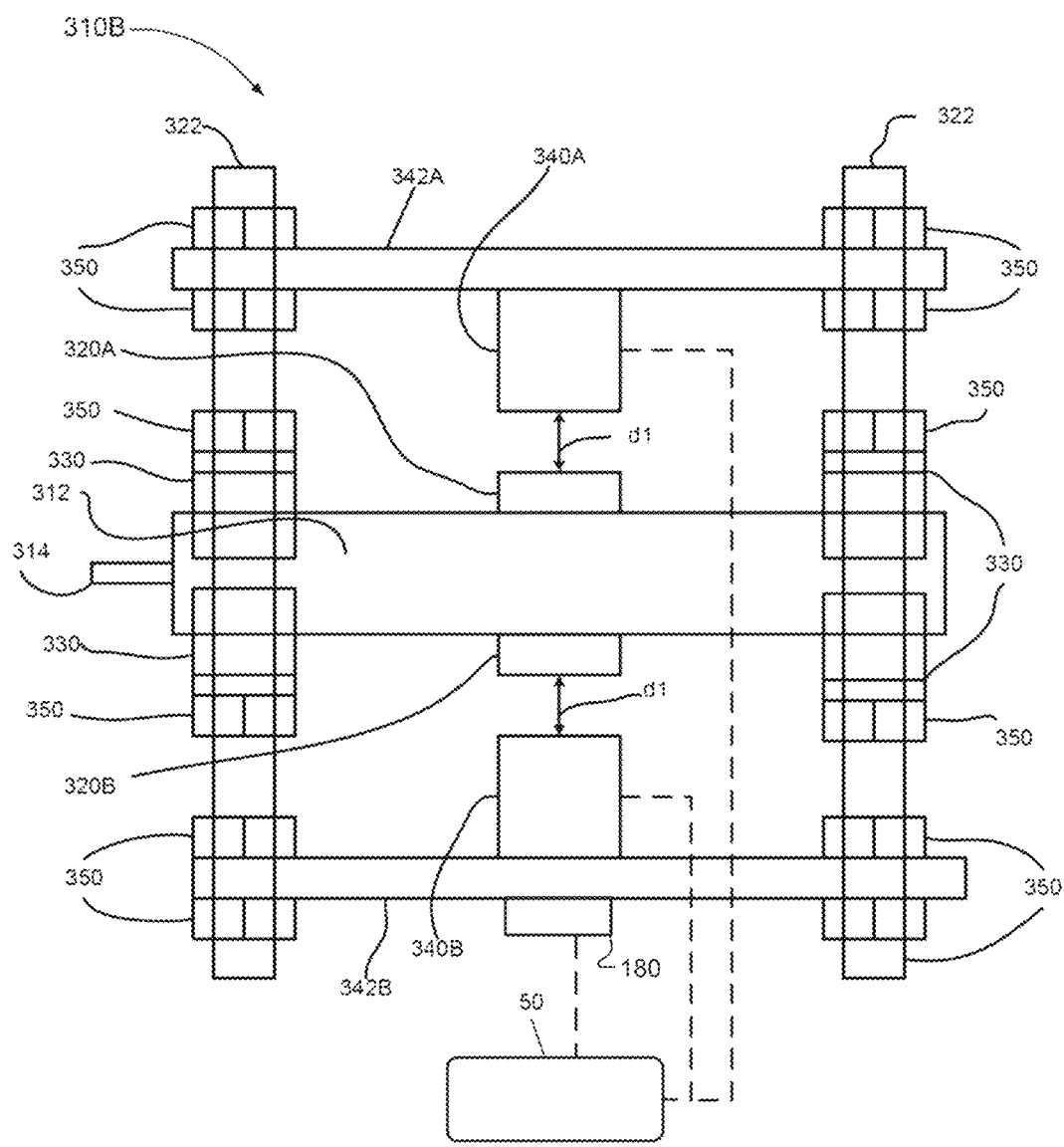

The system 310B of FIG. 11 is similar to the system 310A of FIG. 8. In the system 310B, the prismatic cell battery 312 is mounted so that during dilation the prismatic cell battery 312 is able to expand on two opposite sides, such as top and bottom sides (or front and rear sides). To measure expansion on the two sides, a magnet 320A is arranged on one side of the prismatic cell battery 312 and a magnet 320B is arranged on an opposite side. Opposite to the magnet 320A is a sensor 340A. Opposite to the magnet 320B is a sensor 340B. The sensor 340A measures changes in magnetic force strength with the magnet 320A. The sensor 340B measures changes in magnetic force strength with the magnet 320B.

The system 310B is calibrated in accordance with the present disclosure and modified to account for the distances d1 decreasing during dilation instead of increasing. The system 310B may alternatively be calibrated in any other suitable manner that correlates measured magnetic field strength between the magnet 320A and the sensor 340A, and/or between the magnet 320B and the sensor 340B, with a degree to which the prismatic cell battery 312 has dilated.

Figure 12:
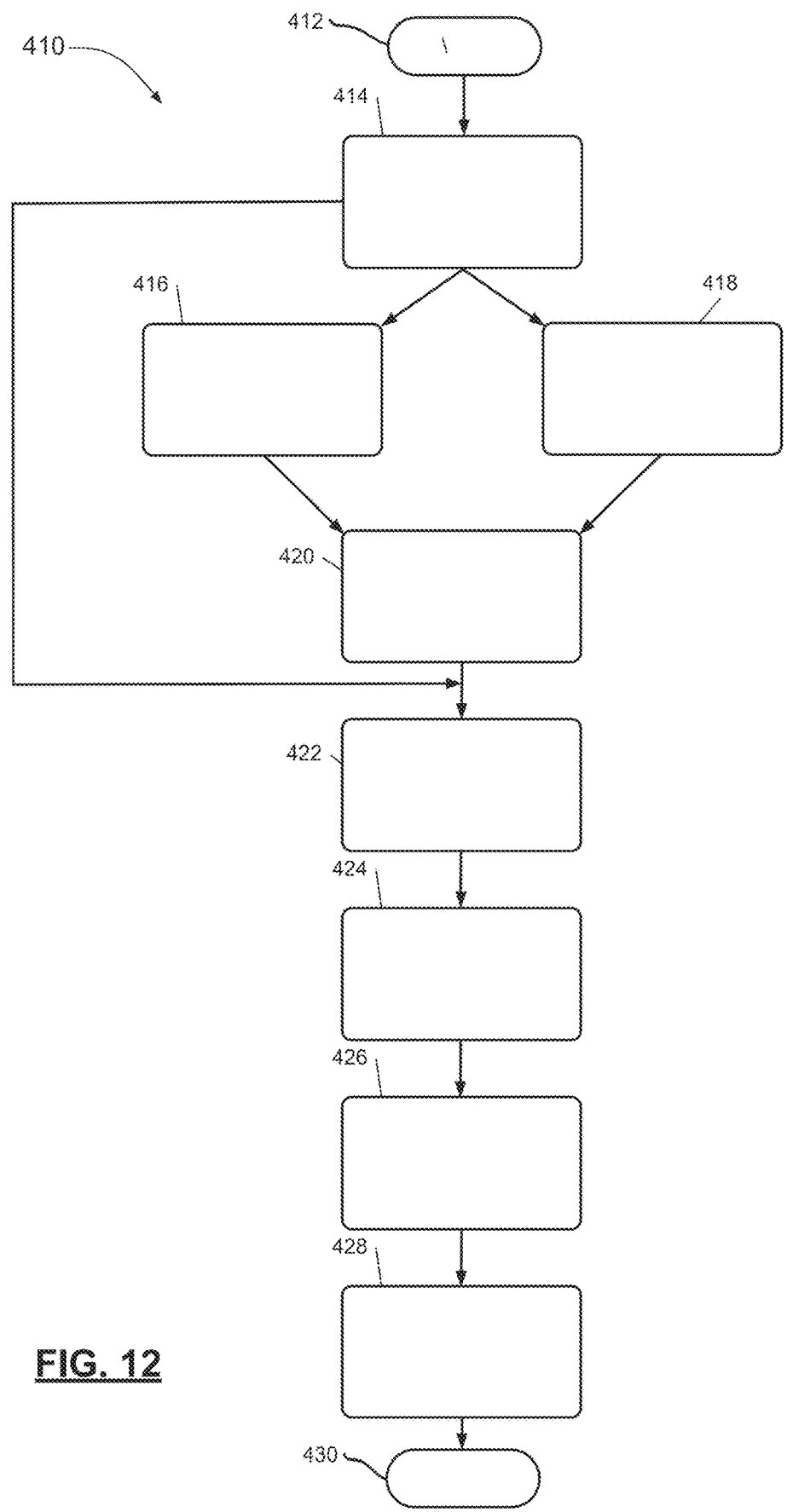
FIG. 12 is a flow chart of an exemplary algorithm in accordance with the present disclosure for calibrating an MFD and measuring dilation of a battery with the MFD.

FIG. 12 illustrates an exemplary calibration method 410 in accordance with the present disclosure. The controller 50 is configured to perform the calibration method 410. The method 410 is described herein in conjunction with the operation of the dilatometer 110 for exemplary purposes only. The method 410 may be implemented with the operation of any other suitable dilatometer, such as any of the other dilatometers and systems 10, 210, and 310A/310B of the present disclosure, as well as the dilatometers of the disclosures incorporated herein by reference, for example.

The method 410 starts at block 412, and at block 414 calibration data is imported into the controller 50. Exemplary calibration data is illustrated in graph 510 of FIG. 13. The calibration data includes a plurality of calibration force readings taken by the sensor 42 representing magnetic force strength between the magnet 40 and the magnetic spacer 30. The calibration force readings are taken at different calibration distances between the magnet 40 and the magnetic spacer 30. For example and with reference to FIG. 13, seven groups 512A-512G of calibration force readings may be taken at seven different calibration distances.

The calibration distances may be spaced apart at any suitable distance intervals across a distance range of any suitable length. For example, the interval may be 50 µm across a distance range of 300 µm. More specifically, the first group 512A of calibration force readings may be taken at a base distance of the distance range at which the magnetic force strength between the magnet 40 and the magnetic spacer 30 2.6 mmv/V. The first group 512A may include any suitable number of calibration force readings taken over any suitable period of time. For example, approximately five samples may be taken over a period of about fifty seconds.

After the samples of the first group 512A are taken and recorded by the controller 50, the micrometer 130 is used to move the translation stage 116 and the magnet 40 closer to the magnetic spacer 30 of the battery 20 by the predetermined distance, such as 50 µm. With the magnet 40 50 µm closer to the magnetic spacer 30, the second group 512B of calibration force readings are taken and recorded. The calibration process is repeated with each of the third group 512C, the fourth group 512D, the fifth group 512E, the sixth group 512F, and the seventh group 512G. The calibration force readings are imported into the controller 50 in any suitable format, such as in the form of the graph 510 of FIG. 13.

From block 414, the method 410 proceeds to blocks 416 and 418. The controller 50 may be configured to perform the tasks of blocks 416 and 418 simultaneously or substantially simultaneously, or the tasks may be performed consecutively. At block 416, the calibration data of graph 510 is normalized. Specifically, the graph 510 is normalized to generate the normalized graph 550 of FIG. 14, for example. The graph 550 is normalized so that the load cell values are on a range of 0.0-1.0, for example. The normalization may be performed because, for example, the exact range of the load cell values of FIG. 13 may not be known at the start of the calibration process.

Figure 15:
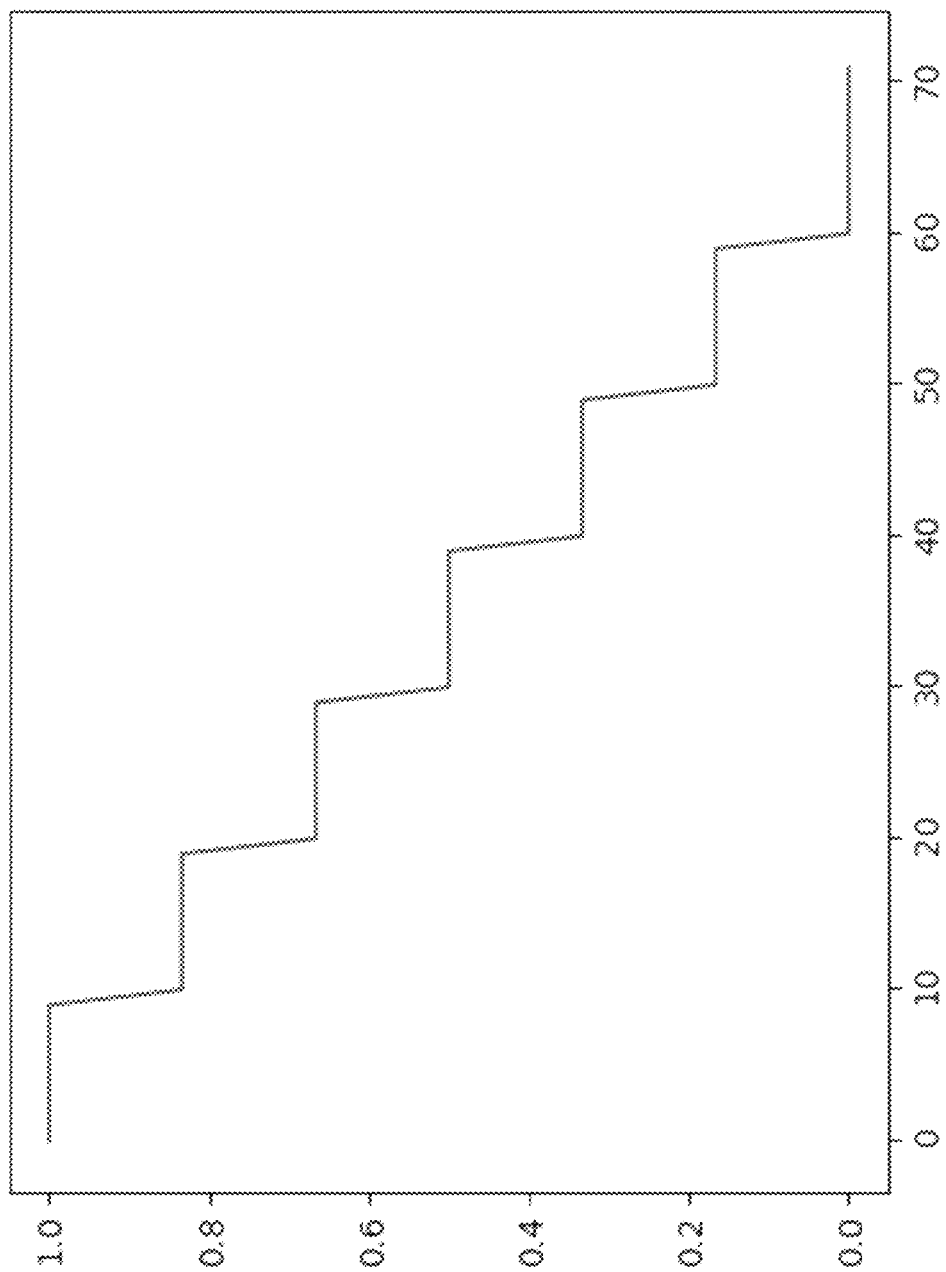
FIG. 15 is a graph of an idealized calibration pattern for the calibration force readings.

Normalization of the graph 550 places the graph 550 on the same scale as the idealized calibration pattern of FIG. 15. The idealized calibration pattern of the graph 610 is an idealized staircase because that is the expected general appearance of the graph 510 of the calibration force readings. To perform the normalization, the controller 50 may be configured to use any suitable normalization formula, such as the following, for example: $(x-x\_min)/(x\_max-x\_min)$.

At block 420, the controller 50 is configured to identify points of the graph 550 that do not fit the constructed idealized calibration pattern of the graph 610 of FIG. 15, and are thus not relevant calibration force readings. Any suitable comparison technique may be performed, such as dynamic time warping (DTW). A series of DTW comparisons are run by the controller 50 between the normalized calibration force readings 550 and the idealized calibration pattern 610 in a "sweep." Starting with the full data set, each successive comparison removes one additional data point from the beginning of the normalized calibration force readings, afterward storing the resulting distance values in an array. Once the series is complete, the minimum distance value corresponds to the beginning of the relevant calibration profile. The process is then repeated with a reverse "sweep" to locate the end of the relevant calibration profile. The results of the DTW are applied to the graph 510. As a result of the DTW comparison of the graph 550 and the graph 610, the portion of the graph 510 at sample numbers greater than 40, and greater than the group 512G, are designated for removal because they do not fit the constructed idealized calibration pattern of FIG. 15. The portions of the graph 510 at sample numbers less than the first group 512A are also designated for removal. The readings designated for removal may be the result of noise that occurs when the battery 20 is placed in the holder 114 and removed from the holder 114.

Figure 13:
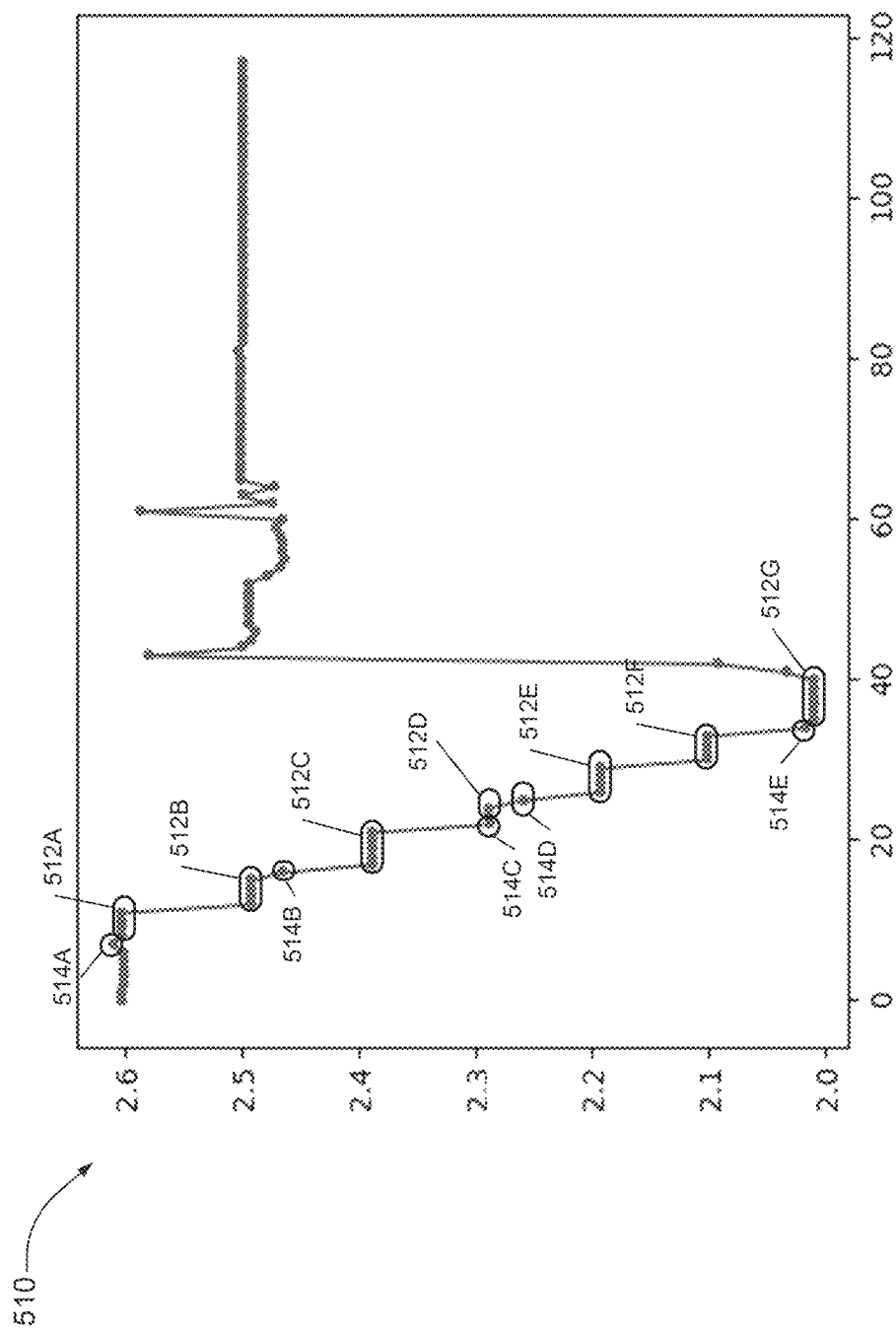
FIG. 13 is a graph illustrating calibration force readings of a load cell identifying magnetic force strength between a magnet of the MFD and a magnetic spacer of a battery for a plurality of samples at different calibration distances.
Figure 14:
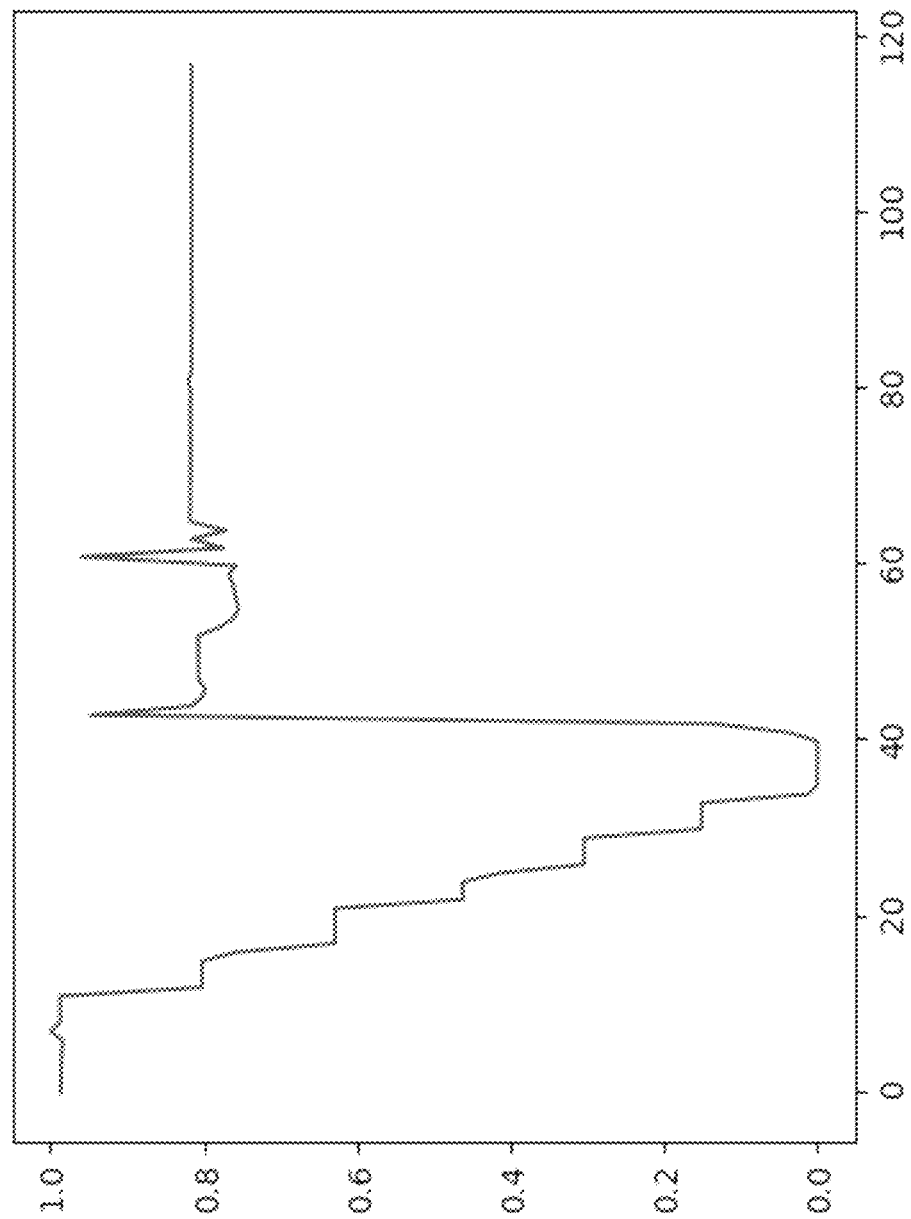
FIG. 14 is a graph illustrating the data of FIG. 13 with the calibration force readings normalized.

From block 420, the controller proceeds to block 422. At block 422, the controller 50 truncates the graph 510 to remove the areas designated by the DTW as not relevant. At block 424, the graph 510 is further processed to remove noise found amongst the calibration force readings. The noise is identified by subtracting adjacent points of the graph 510 from each other in both directions, and identifying irregularities. The points at 514A-514E of FIG. 13 are examples of noise removed at block 424 by the controller 50.

Figure 16:
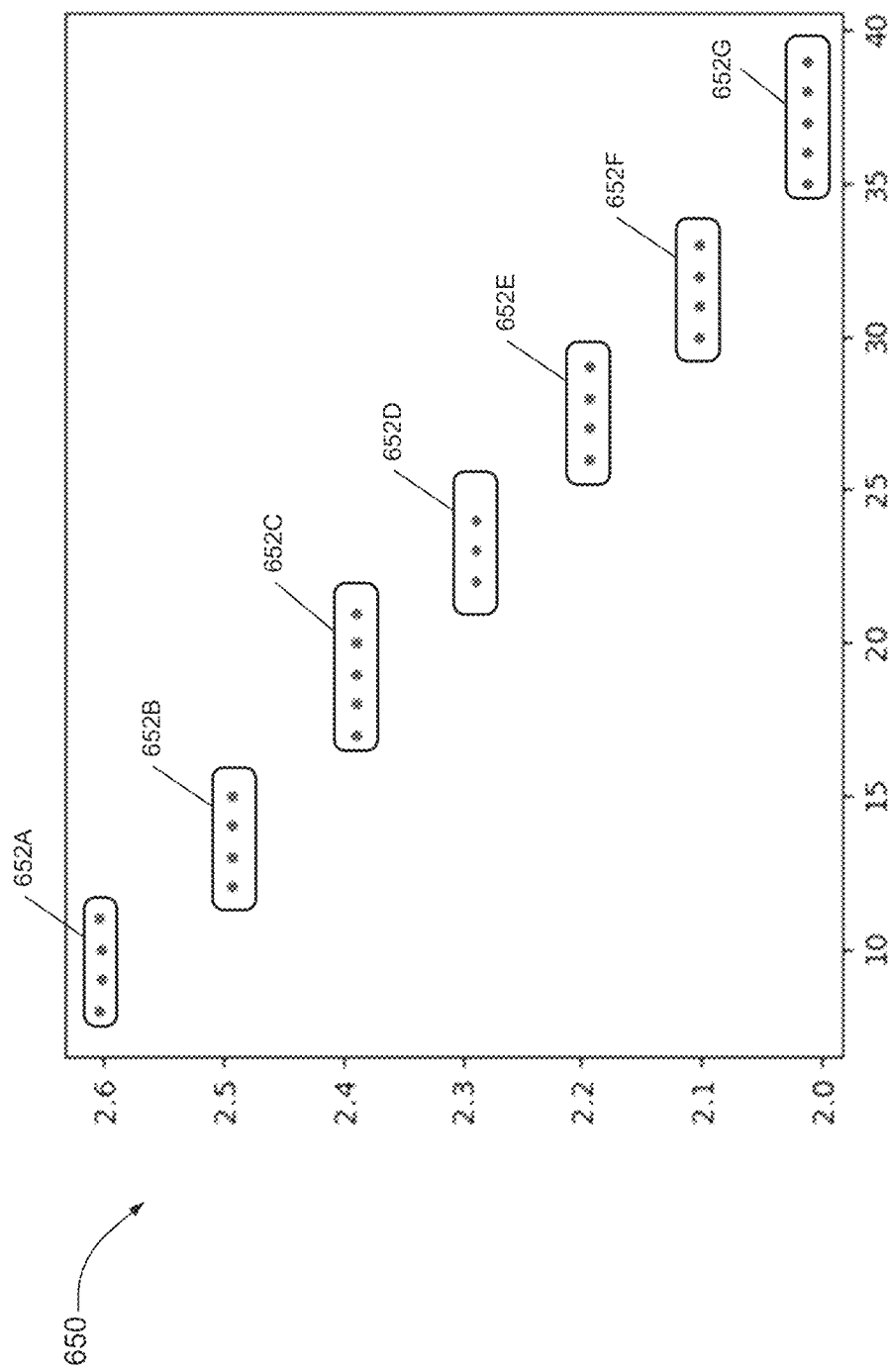
FIG. 16 is a graph of the calibration force readings binned and labeled according to magnetic force strength.

From block 424, the method 410 proceeds to block 426. At block 426, the calibration force readings are organized in bins and labeled according to the calibration distance between the magnet 40 and the magnetic spacer 30 at which the readings were taken. For example and as illustrated in FIG. 16 at the graph 650, bin 652A includes the calibration force readings of the group 512A labeled with the start distance of the distance range, which in the current example is 250 µm. Bin 652B includes the calibration force readings of the group 512B, and is labeled at the second distance of the distance range, which in the current example is 50 µm less than the base 250 µm, or 200 µm. Bin 652C includes the calibration force readings of the group 512C, and is labeled with the next distance of the distance range, which in the current example is 150 µm. Bin 652D includes the calibration force readings of the group 512D, and is labeled with the next distance of the distance range, which in the current example is 100 µm. Bin 652E includes the calibration force readings of the group 512E, and is labeled with the next distance of the distance range, which in the current example is 50 µm. Bin 652F includes the calibration force readings of the group 512F, and is labeled with the next distance of the distance range, which in the current example is 0 µm from the base distance. Bin 652G includes the calibration force readings of the group 512G, and is labeled with the next distance of the distance range, which in the current example is −50 µm relative to the base distance.

At block 426, the controller 50 is configured to identify whether one of the predetermined calibration distances was missed during the manual actuation of the micrometer 130. For example, in the graph 650 none of the predetermined calibration distances were missed. Thus, the difference in the load cell value between adjacent ones of the bins 652A-652G is 0.1 mV/V. However, if one of the predetermined calibration distances were missed, such as the bin 652D at 100 µm, the difference in the load cell value between the bin 652C and the bin 652E would be 0.2 mV/V. The controller 50 is configured to utilize statistical methods to determine the typical step height and properly label bin 652E with the proper distance of 100 µm, corresponding to two steps of 0.1 mV/V. If the controller 50 were not configured to recognize the 0.2 mV/V difference between bin 652C and bin 652E, the bin 652E may otherwise be improperly labeled at the distance of 50 µm.

Whether one of the calibration distances was missed during the manual actuation of the micrometer 130 may be identified in any suitable manner. For example, the controller 50 is configured to calculate the differential between each data point of the bins 652A-652G, where the data points of each one of the bins 652A-652G provide a differential value at or around 0, and the first data point on a new stair or bin 652A-652G provides a value approximate to the step height. In the example of FIG. 16, (treating values near 0, such as 0.0001, as equal to 0 for simplicity), the series of differential values may be the following: 0, 0, 0, 0, −0.1, 0, 0, 0, −0.1, 0, 0 . . . . So, most values are 0, while some are at the step height of −0.1. The controller 50 is configured to run a kernel density estimate (KDE) on the data points. The KDE estimates a continuous curve, where the height of the curve corresponds to the estimated frequency of the value appearing in the data. A higher peak means that the value shows up more often. An exemplary KDE will return a tall peak around 0, and a shorter peak around −0.1, which is equal to a typical step height.

The controller 50 is configured to use the following formula to determine how many steps have occurred between successive data points: delta=round(diff_val/pk_two_loc). The value of the delta will be an integer representing the number of steps that have occurred. For example, if the differential value is −0.1, the resulting calculation is: delta=round(−0.1/−0.1), which results in a delta value of 1, meaning one step has occurred. However, if the differential value is −0.2 (delta=round(−0.2/−0.1)), the delta value is 2, which means that two steps have occurred. Thus, if the controller 50 identifies the following differential series: 0, 0, 0, 0, −0.1, 0, 0, 0, −0.2, 0, 0, 0, −0.1, 0, 0, 0, then the delta values will be: 0, 0, 0, 0, 1, 0, 0, 0, 2, 0, 0, 0, 1, 0, 0, 0. The number in the preceding series identifies how many steps have occurred in the data. A value of 0 means the analysis is on the same step as the previous data point, a value of 1 means the analysis has moved one step, and a value of 2 means that the analysis has moved two steps, etc. And if the set of steps is known to be 0 μm, 10 μm, 20 μm, 30 μm, 40 μm, 50 μm, etc., then the controller 50 is configured to accurately bin and label the data points, even if the operator accidentally missed a step, avoiding potential "off-by-one" type errors.

Figure 17:
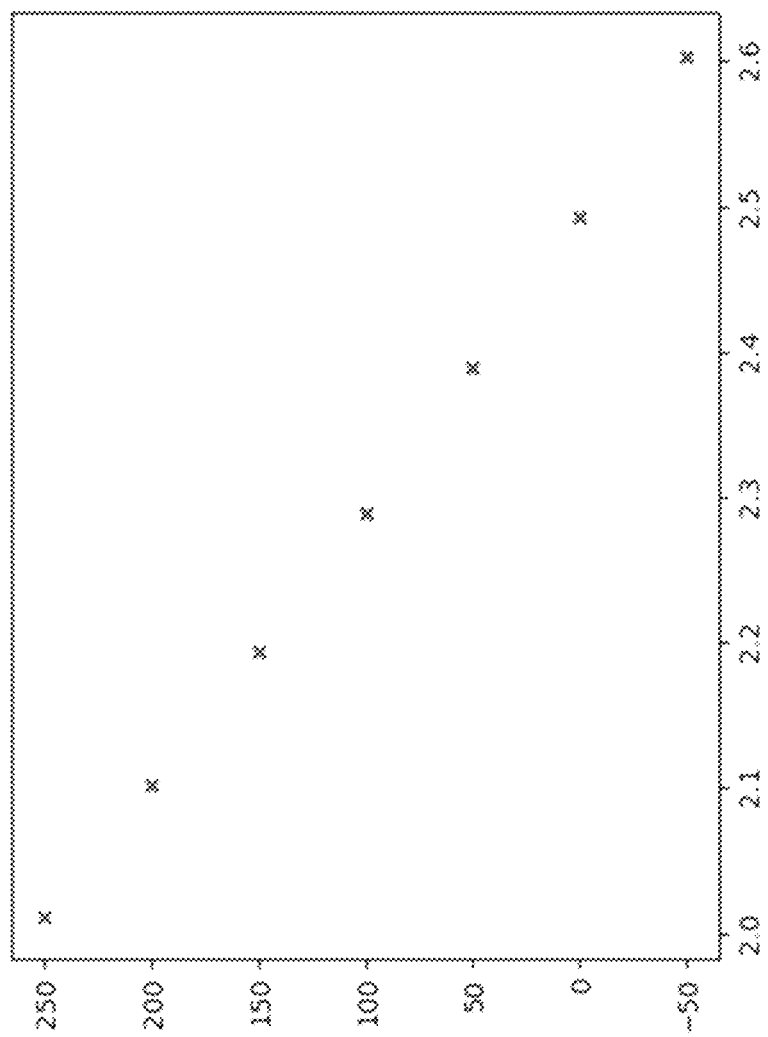
FIG. 17 is a graph of load cell value versus distance between dilatometer magnet and magnetic spacer of a battery, with the calibration force readings plotted thereon.

From block 426, the method 410 proceeds to block 428. At block 428, the controller 50 contains the data shown on the graph 710 of FIG. 17, which is the load cell value of the sensor 42 versus the distance between the magnet 40 and the magnetic spacer 30 relative to 0 μm, the 0 μm point being the base distance. The controller 50 has a configurable parameter denoting the step height or the distance for each one of the bins 652A-652G, as well as the load cell value associated with each one of the bins 652A-652G, as explained above. Based on this information, the controller contains data from the bins 652A-652G on the graph 710. The points of each bin 652A-652B are consolidated into a single point in the graph 710 because the load cell value and the distance value for each data point is the same or generally the same.

Figure 18:
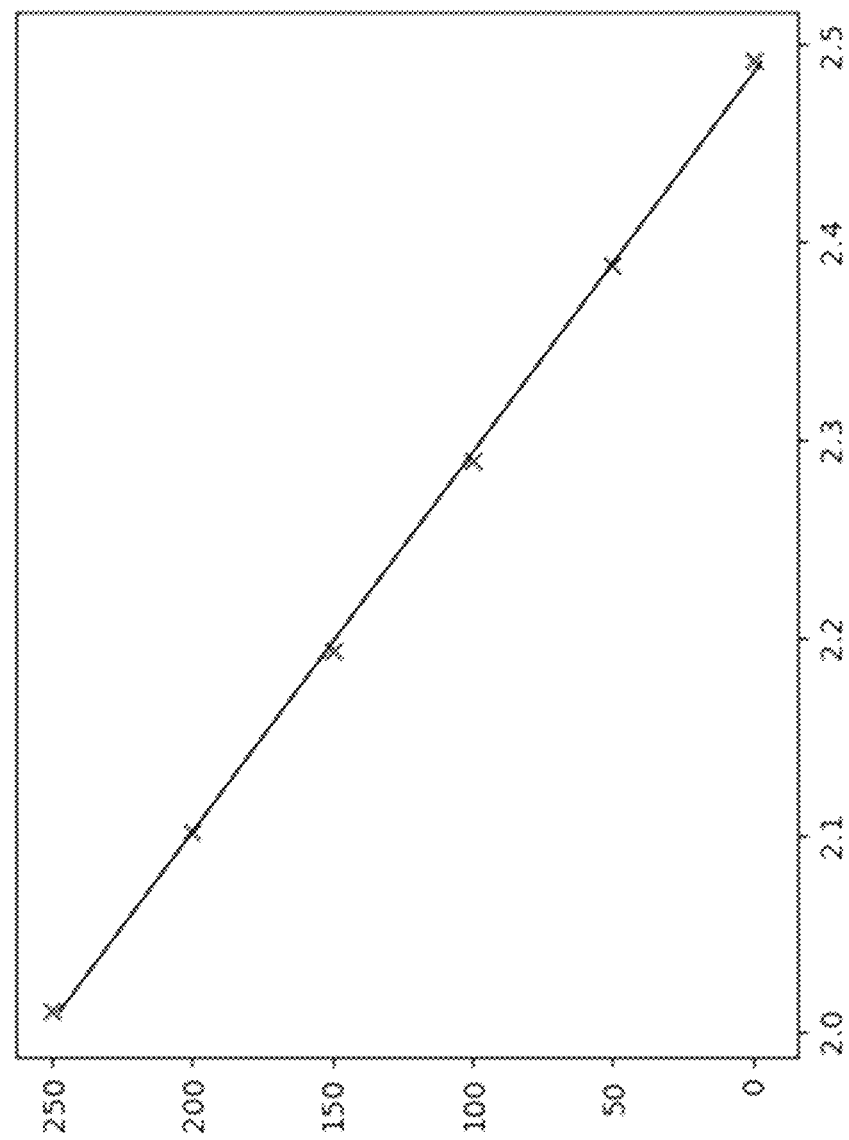
FIG. 18 is a graph similar to the graph of FIG. 17, the graph of FIG. 18 further including the slope of the calibration force readings.

Also at block 428, the controller 50 is configured to identify the slope of the points of the graph 710. The slope may be identified in any suitable manner, such as by linear regression. In the example of FIG. 18, the controller is configured to perform linear regression to identify a slope of −520.72 (y-int of 1294.64; $r^2$ of 0.999265) on the graph 750. The calibration ends at block 430.

Before or after calibration, the dilatometer 110 is configured to measure dilation of the battery cell 20, or any other suitable battery, as the battery cell 20 is run through charge and discharge cycles. Leads are connected to the dilatometer 110 for cycling the battery cell 20. The controller 50 is configured to record data from the load cell 120 at any suitable time increments, such as 5 second increments, for example.

To identify the degree of dilation of the electrode 24 and/or the electrode 26, the controller 50 is configured to use the graph 750 of FIG. 18 and the identified slope. Using the calibration graph 750, the controller 50 assigns each reading of the load cell sensor 42 with a distance reading along the distance range. For example, a load cell value from the sensor 42 of 2.2 mV/V corresponds to a distance of 150 μm from the starting point of the distance range. In other words, a reading of 2.2 mV/V corresponds to an increase in electrode thickness of 150 μm. As applied to the example of FIGS. 1A and 1B, the thickness t1 of the electrode 26 will have increased 150 μm to the thickness t2 of FIG. 1B. Similarly, a reading of 2.25 mV/V corresponds to an increase in electrode thickness of about 125 μm. The calibration graph 750 may be used to identify the dilation distance of any electrode of any suitable battery configuration, including the battery configurations described above, as well as any battery configuration described in the commonly assigned U.S. Patent Applications identified above and incorporated herein by reference (which again are U.S. patent application Ser. Nos. 18/087,452; 18/305,075; and 18/526,610).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A dilatometer configured to measure dilation of an electrode in a battery, the dilatometer comprising:
   a first support configured to support the battery;
   a magnet mounted adjacent to the first support;
   a magnetic force sensor configured to measure a magnetic force strength between the magnet and a magnetic spacer within the battery supported by the first support;
   a second support configured to move the magnet relative to the magnetic spacer of the battery supported by the first support; and
   a controller configured to:
      receive calibration force readings from the magnetic force sensor, the calibration force readings including the magnetic force strength between the magnet and the magnetic spacer at different calibration distances resulting from movement of the magnet relative to the magnetic spacer across a distance range during calibration;
      assign a position value to each one of the calibration force readings, the position value is a distance between the magnet and the magnetic spacer of the battery; and
      predict the magnetic force strength between the magnet and the magnetic spacer across an entirety of the distance range based on the position values of the calibration force readings.

2. The dilatometer of claim 1, wherein the controller is further configured to:
   receive a battery test force reading from the magnetic force sensor, the battery test force reading including the magnetic force strength between the magnet and the magnetic spacer of the battery during a dilation test of the battery; and
   identify a dilation distance within the distance range corresponding to the battery test force reading, the dilation distance corresponding to dilation of the electrode in the battery.

3. The dilatometer of claim 1, wherein the battery is a coin cell battery.

4. The dilatometer of claim 1, wherein the different calibration distances are intervals of 10 μm.

5. The dilatometer of claim 1, wherein the different calibration distances are intervals of 50 μm.

6. The dilatometer of claim 1, wherein the calibration force readings include multiple readings at each one of the different calibration distances.

7. The dilatometer of claim 1, wherein the distance range is 250 μm.

8. The dilatometer of claim 1, wherein the magnetic force sensor is a load sensor.

9. The dilatometer of claim 1, further comprising a translation stage configured to move the second support and the magnet relative to both the first support and the magnetic spacer of the battery supported by the first support.

10. The dilatometer of claim 1, wherein the controller is further configured to:
    normalize the calibration force readings into normalized calibration data, and construct an idealized calibration pattern based on the calibration force readings; and
    perform dynamic time warping (DTW) based on the calibration force readings, the normalized calibration data, and the idealized calibration pattern.

11. The dilatometer of claim 10, wherein the controller is configured to further process the calibration force readings by truncating the calibration force readings based on the DTW and removing noise from the calibration force readings.

12. The dilatometer of claim 11, wherein assigning the position value to each one of the calibration force readings includes arranging the calibration force readings into groups and labeling the groups with the position values.

13. The dilatometer of claim 12, wherein the controller is configured to predict the magnetic force strength between the magnet and the magnetic spacer across the entirety of the distance range by performing linear regression across the groups.

14. A dilatometer configured to measure dilation of an electrode in a battery, the dilatometer comprising:
- a first support configured to support the battery;
- a magnet mounted adjacent to the first support;
- a magnetic force sensor configured to measure a magnetic force strength between the magnet and a magnetic spacer within the battery supported by the first support;
- a second support configured to move the magnet relative to the magnetic spacer of the battery supported by the first support; and
- a controller configured to:
  - receive calibration force readings from the magnetic force sensor, the calibration force readings including the magnetic force strength between the magnet and the magnetic spacer at different calibration distances resulting from movement of the magnet relative to the magnetic spacer across a distance range during calibration;
  - normalize the calibration force readings into normalized calibration data;
  - construct an idealized calibration pattern based on the calibration force readings;
  - perform dynamic time warping based on the calibration force readings, the normalized calibration data, and the idealized calibration pattern to identify irrelevant portions of the calibration force readings;
  - assign a position value to each one of the calibration force readings, the position value is a distance between the magnet and the magnetic spacer of the battery;
  - predict the magnetic force strength between the magnet and the magnetic spacer across an entirety of the distance range, based on the position values of the calibration force readings;
  - receive a battery test force reading from the magnetic force sensor, the battery test force reading including the magnetic force strength between the magnet and the magnetic spacer of the battery during a dilation test of the battery; and
  - identify a dilation distance within the distance range corresponding to the battery test force reading, the dilation distance corresponding to dilation of the electrode in the battery.

15. The dilatometer of claim 14, wherein assigning the position value to each one of the calibration force readings includes arranging the calibration force readings into groups and labeling the groups with the position values.

16. The dilatometer of claim 15, wherein the controller is configured to predict the magnetic force strength between the magnet and the magnetic spacer across the entirety of the distance range by performing linear regression across the groups.

17. A method for measuring dilation of an electrode in a battery with a dilatometer, the method comprising:
- receiving calibration force readings at a controller of the dilatometer from a magnetic force sensor of the dilatometer, the calibration force readings including a magnetic force strength between a magnet of the magnetic force sensor and a magnetic spacer of the battery at different calibration distances resulting from movement of the magnet relative to the magnetic spacer across a distance range during calibration;
- assigning with the controller a position value to each one of the calibration force readings, the position value is a distance between the magnet and the magnetic spacer of the battery;
- predicting with the controller the magnetic force strength between the magnet and the magnetic spacer across an entirety of the distance range based on the position values of the calibration force readings;
- receiving at the controller a battery test force reading from the magnetic force sensor, the battery test force reading including a magnetic force strength between the magnet and the magnetic spacer of the battery during a dilation test of the battery; and
- identifying with the controller a dilation distance within the distance range corresponding to the battery test force reading, the dilation distance corresponding to dilation of the electrode in the battery.

18. The method of claim 17, further comprising:
- normalizing with the controller the calibration force readings into normalized calibration data, and constructing with the controller an idealized calibration pattern based on the calibration force readings; and
- performing dynamic time warping with the controller based on the calibration force readings, the normalized calibration data, and the idealized calibration pattern.

19. The method of claim 17, wherein assigning the position value to each one of the calibration force readings with the controller includes arranging the calibration force readings into groups and labeling the groups with the position values with the controller.

20. The method of claim 19, further comprising predicting the magnetic force strength between the magnet and the magnetic spacer across the entirety of the distance range by performing linear regression across the groups with the controller.

* * * * *